Aug. 4, 1959 H. J. BERNARD ET AL 2,898,124
TRAILER HITCH
Filed May 13, 1957 2 Sheets-Sheet 1

INVENTORS
HERBERT J. BERNARD
JOSEPH A. MORGAN
BY
ATTORNEY

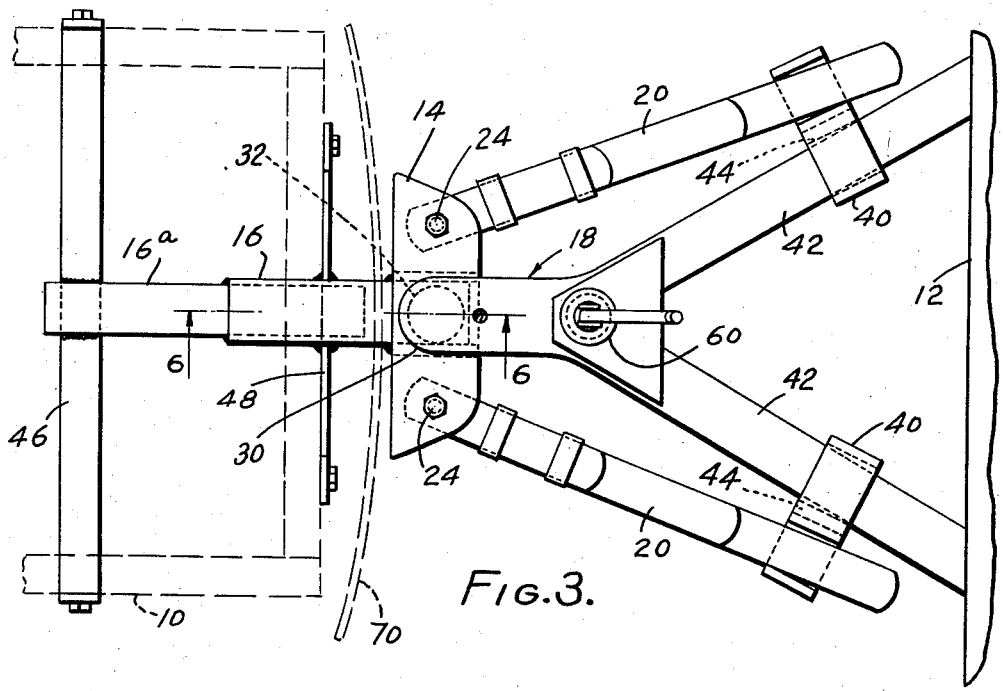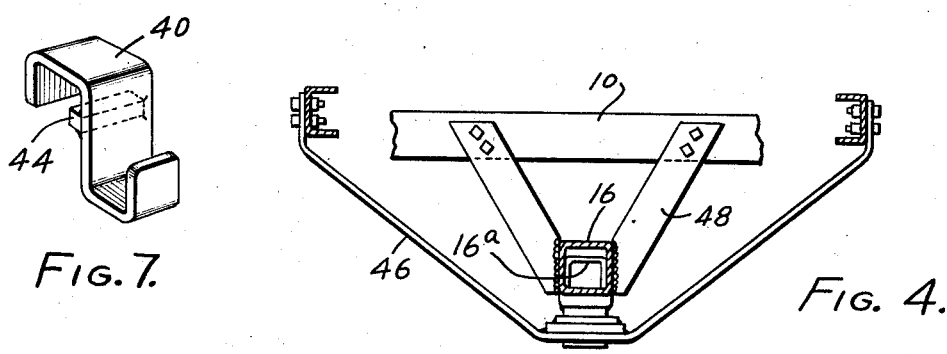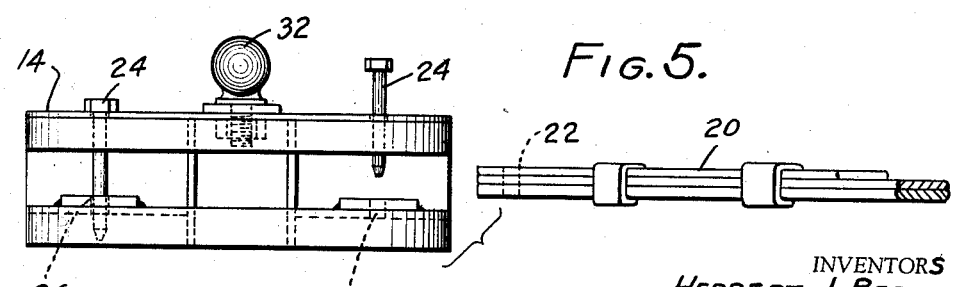

United States Patent Office 2,898,124
Patented Aug. 4, 1959

2,898,124

TRAILER HITCH

Herbert J. Bernard and Joseph A. Morgan,
Sun Valley, Calif.

Application May 13, 1957, Serial No. 658,878

1 Claim. (Cl. 280—406)

This invention relates to an improved trailer hitch and has for one of its principal objects the provision of a device of the class described, which is so constructed that, when properly fitted onto an automobile or towing vehicle, it will balance the tongue weight of the trailer on all four wheels of the towing car thereby providing an easier and a safer towing job.

Another important object of the invention is to provide a safety trailer hitch which will eliminate side sway, suction from passing trucks and undesirable weaving and bobbing.

Another important object of the invention is the provision of a trailer hitch which will eliminate the need for overload springs on practically all of the usual types of mobile homes now in use.

Still another and further important object of the invention is to provide a hitch for trailers which will maintain the weight of the tow car on the front wheels thereof for better steering and control, and which will also retain the headlights in proper position for night driving.

Yet another object of the invention is the provision of a high quality stabilizer trailer hitch which is easy to install and which can be very readily connected and disconnected with no complicated parts and nothing to wear.

Other and further important objects of the invention will be apparent from the disclosures in the accompanying drawings and following specification.

The invention, in a preferred form, is illustrated in the drawings and hereinafter more fully described.

In the drawings:

Figure 3 is an enlarged top plan view taken on the plane of the line 3—3 of Figure 1, looking in the direction indicated by the arrows.

Figure 4 is a vertical section on the line 4—4 of Figure 2, looking in the direction indicated.

Figure 5 is a partially exploded view taken on the line 5—5 of Figure 4 and illustrating more particularly the ready connection between the parts.

Figure 7 is a perspective view of one of the removable spring connecter elements which comprise an essential portion of the structure of this invention.

As shown in the drawings:

Figure 1:
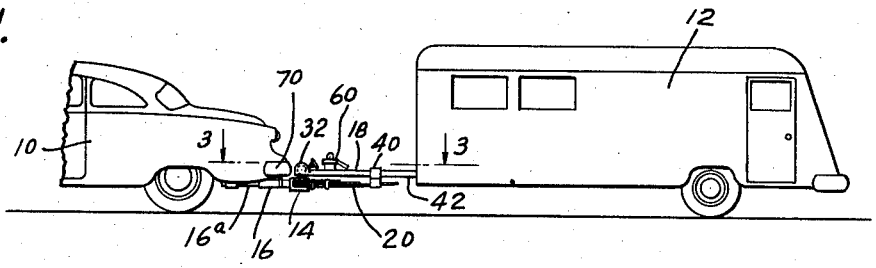
Figure 1 is an elevation of a towing car and trailer connected by the improved trailer stabilizer hitch of this invention.
Figure 2:
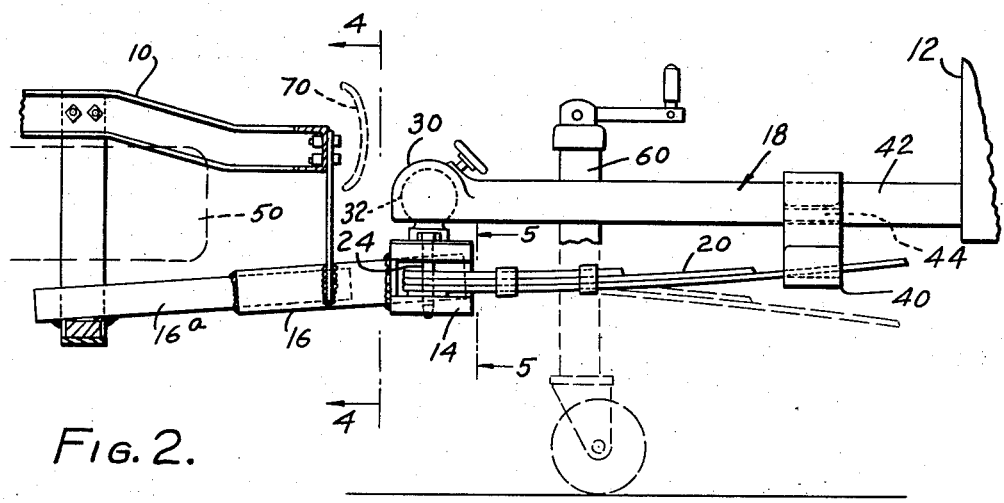
Figure 2 is an enlarged detail of a portion of the structure of Figure 1, illustrating the device of this invention in actual operation.

The reference numeral 10 indicates generally a representative automobile, and the reference numeral 12 indicates generally, a representative trailer which are connected by the safety stabilizer trailer hitch of this invention.

Figure 6:
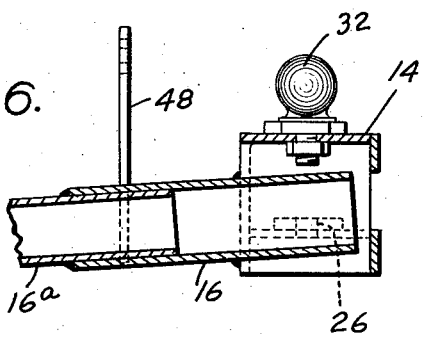
Figure 6 is a vertical section, parts being broken away on the lines 6—6 of Figure 3, looking in the direction indicated.
Figure 8:
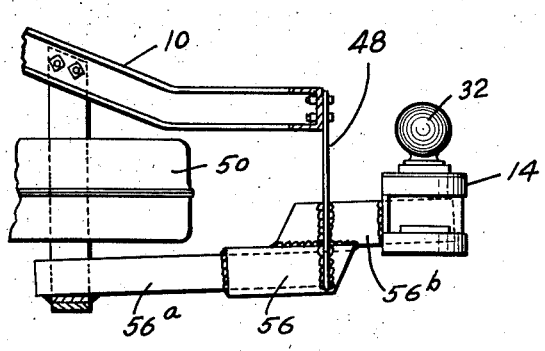
Figure 8 is a side elevation of a slightly modified form of the invention.

The hitch itself comprises essentially a housing 14 shaped as best shown in Figures 3, 5 and 6 and having a square central opening or notch in its forward face adapted to receive the end of a support 16, which is fastened by welding or the like, to two or more points on the chassis of the automobile 10. This element 16 is preferably of tubing, square in cross section and composed of two parts 16 and 16a, which telescope and which when fitted into the frame of the car 10, can then be welded into adjusted position relative to each other so that a proper relationship exists between the tow car structure and the trailer tongue 18.

The housing 14 has two rearwardly facing openings into which the ends of leaf springs 20 are adapted to be removably fitted. One of these leaf springs is best illustrated in Figure 5, and the end which fits into the housing 14 is provided with an opening 22 into which a locking pin 24 can be fitted after the locking pin has been passed through an opening in the top plate of the housing 14, and with its lower end finally fitting into a socket 26 formed in the lower plate of the housing 14.

The leaf springs are shown as comprising three elements held together by shackles or the like and of varying lengths as is usual in these constructions, but obviously other types of springs may be employed.

When the socket 30 of the trailer tongue 18 is fitted onto the ball 32 which is mounted on the housing 14, the two springs 20 are fitted into the housing and fixed therein by means of the pins 24, after which hook elements such as those shown at 40 in Figure 7 are employed to hold the outer ends of the springs 20 in proper tensioned and predetermined relationship with the V-shaped portions 42 of the trailer tongue element. The hook portions 40 are each provided with an extension or protuberance 44 which acts as a spacer against the adjacent portion of the trailer tongue 42, whereby a proper relationship between the parts is maintained at all times.

As best shown in Figure 4, the tubing elements 16 and 16a can be fastened to the chassis of the car 10 in various manners as by means of brackets 46 and 48, and in the event that the gas tank 50 of the car 10 is too low for a straightaway fitting, a double welded telescopic extension 56 and 56a and 56b may be employed for supporting the housing 14 with its nob or ball 32.

It will be obvious that when the connections are properly made, the temporary wheel support 60 for the trailer tongue is moved up out of the way, as shown in Figure 1, so as not to interfere with proper driving operation.

It will be evident that herein is provided an extremely simple but sturdy and efficient safe trailer hitch, wherein the flexible leaf springs do the lifting with no strain on the chassis of the towing car, and which can be readily mounted on practically any type of car with little or no difficulty. A low hitch head can be provided for vacation or light trailers, and a higher hitch head for larger and heavier trailers. A removable hitch head adapter can also obviously be employed.

The device, when fitted onto a car, is practically unnoticeable when not in use, and actually furnishes an additional safety measure as supplementing the bumper 70. Connections can be made in a minimum space of time with no possibility of error and subsequent damage to either the car or the trailer, and installation is relatively easy and simple, and can be readily accomplished without the use of expensive equipment.

We are aware that many changes may be made and numerous details of construction varied throughout a wide range without departing from the principles of this invention, and we therefore, do not propose limiting the patent granted hereon otherwise than as necessitated by the prior art.

We claim as our invention:

A hitch for trailers, which trailers include a forwardly extending tongue having a socket therein, including a housing adapted to be fastened to and supported by the rear end of a tow car, a pair of springs, pins for pivotally and removably connecting one end of each spring to the housing, means for removably connecting the other end of each spring to the trailer tongue, a ball on the housing for operative association with the socket of the trailer tongue, the removable connections between the springs and the housing including aligned openings and sockets in the housing for the pins, the removable connections between the ends of the springs and the trailer tongue comprising hooks, said hooks comprising S-shaped brackets, said brackets including integral protuberances to space the spring ends from the juxtaposed portion of the trailer tongue, a telescopic tubular element forming part of the fastening and support means of the housing, said tubular element being square in cross section, brackets and welds comprising fixed supports and connections between the car chassis and the telescopic housing support, the two portions of the telescopic support being welded together when finally fixed in adjusted housing supporting position.

References Cited in the file of this patent

UNITED STATES PATENTS

| 2,597,657 | Mathisen | May 20, 1952 |
| 2,635,891 | Cook | Apr. 21, 1953 |
| 2,643,891 | Mosley | June 30, 1953 |
| 2,793,879 | Bair | May 28, 1957 |
| 2,817,541 | Mathisen | Dec. 24, 1957 |

FOREIGN PATENTS

| 654,890 | Great Britain | July 4, 1951 |